United States Patent Office 3,840,601
Patented Oct. 8, 1974

3,840,601
PROCESS FOR PREPARATION OF
METHYL IONONES
Peter S. Gradeff, Andover, N.J., assignor to
Rhodia Inc., New York, N.Y.
No Drawing. Filed Feb. 7, 1972, Ser. No. 224,258
Int. Cl. C07c 49/18, 29/00
U.S. Cl. 260—594  11 Claims

ABSTRACT OF THE DISCLOSURE

A process is provided for the preparation of methyl ionones by the aldol condensation of citral and methyl ethyl ketone at a temperature below about 10° C., followed by dehydration to form a pseudo methyl ionone, which can then be cyclized to form the methyl ionone.

"Methyl ionone" is a term used in perfumery to designate ionones which are prepared by the condensation-dehydration reaction of citral with methyl ethyl ketone, followed by cyclization. A mixture of several methyl ionones is obtained:

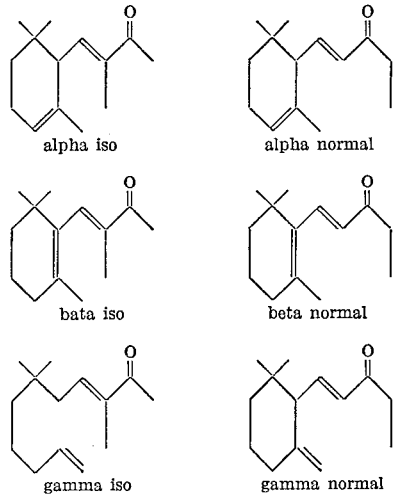

The *alpha*-iso isomer has been incorrectly referred to as "*gamma*-methyl ionone," and this name is still used to designate material that is rich in this isomer. The Essential Oil Association Standard for methyl ionone defines "*gamma*-methyl ionone" as a mixture of at least 60% iso content. The iso isomers, mainly *alpha* with some *beta* and *gamma*, are the most desirable of all the methyl ionones as perfume ingredients, and thus the preparation of pseudo-iso-methyl ionone has been given prime attention.

If the aldehyde group of citral reacts with the methyl group of butanone, pseudo-normal methyl ionone (I) is obtained, whereas reaction with the methylene group will lead to the formation of pseudo-iso-methyl ionone (II):

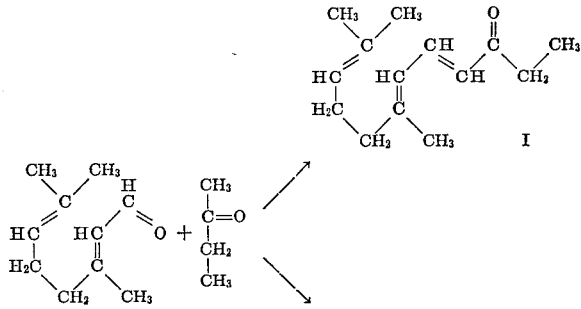

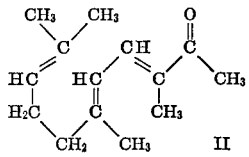

Both compounds have been described previously and it is known that each of them can be converted by the action of acids or of Lewis-acids into the corresponding methyl ionones, i.e., (I) into *alpha*-normal methyl ionone, *beta*-normal-methyl ionone, and *gamma*-normal-methyl ionone, and (II) into *alpha*-iso-methyl ionone, *beta*-iso-methyl ionone, and *gamma*-iso-methyl ionone.

Bedoukian in *Perfumery and Flavoring Synthetics*, 2d Ed., 1967, p. 204, states:

"The problem of condensation of butanone with citral in order to achieve high yields of iso methyl pseudo ionone was intensively investigated. It was found that the catalyst employed has a profound influence on the ratio of the two methyl pseudo ionones formed and certain salts of quaternary amines give good yields of the desirable pseudo ionone."

The isomeric methyl ionones have been studied by Haarmann and Reimer, German patent No. 150,825, Köster, *Journal für praktische Chemie* 2 143, 249 (1935), and by Pope and Bogert, *Journal of Organic Chemistry* 2 279 (1938). Cherbulier and Hegar, *Helv. Chim. Acta* 15 199 (1932), condensed citral with the Grignard-compound of 3-bromo-butanone-2 to synthesize pseudo iso-methyl ionone, but, although this method could be much improved by Beets, *Rec. trav. chim.* 69 307 (1950), it is too cumbersome to be of practical use.

The condensation of certain aldehydes with methyl ethyl ketone in the presence of strong acids takes place mainly at the methylene group of methyl ethyl ketone. C. Harries and G. H. Müller, *Ber. 35* 970 (1902) obtained 2-methyl-1-phenyl-buten-1-one-3 in high yield by introduction of hydrogen chloride gas into a mixture of benzaldehyde and butanone. However, this method is of no use for the condensation of citral with methyl ethyl ketone because citral is highly unstable under such conditions.

Beets and Van Essen, British Patent No. 812,727, carried out the condensation of citral and methyl ethyl ketone in the presence of condensation agents having a cationic part (either potassium or an organic cation, in which the valences of the central atom are occupied by substituted or unsubstituted hydrocarbon groups such as a quaternary ammonium ion), and a basic anionic part with a base strength equal to or higher than the base strength of the cyanide anion (such as hydroxide or meth-oxide). Surprisingly, potassium is far superior to either lithium or sodium, and while rubidium and cesium can be used in lieu of potassium, they are much to expensive to be of practical value.

The reaction is carried out in a homogeneous reaction medium so that both reactants and catalysts are in solution in the same phase, such as a lower aliphatic alcohol, and preferably in the absence of water, or in the presence of only small amounts of water. The reaction temperature is between 50° C. and the boiling point of the reaction mixture, but it is indicated that lower temperatures can be used. The lowest reaction temperature used in the working Examples is 33° to 36° C., and the yield in this case is lower than in the Examples in which higher reaction temperatures are used, suggesting that as reaction temperature is reduced, the reaction is slowed, and the yield decreases. However, even at elevated temperatures the yields are not good, the highest yield being approximately 49% based on citral, and the methyl ionone products contain from 73% to 82% of the iso isomer. Moreover, the amount of condensation agent required is quite large, too large to be practical in industrial applications.

Since the issuance of this British patent, there have not been any significant improvements in the process, giving higher yields or better ratios of iso to normal isomers. The demand for methyl ionone is constantly growing, however, and the price continues to increase. *The Oil, Paint and Drug Reporter* for November, 1970, estimated a total annual production of about 571,000 pounds of methyl ionones, with an annual growth of 10%. The most desirable grades, rich in *alpha*-iso isomer, cost nearly double the price of the lower grades. The reason is that methyl ionone is widely used in basic perfume compositions, and often in large amounts. For instance, Maurer's basic formula for amber requires 20% methyl ionone, while for violet 30% is prescribed (E. S. Maurer, *Perfumes and Their Production*, United Trade Press Ltd., London, 1958).

In accordance with the instant invention, an improved process for preparing methyl ionones from citral and lower alkyl homologues thereof by condensation with methyl ethyl ketone is provided, giving a higher yield and an increased relative amount of the most desirable isomethyl ionone isomer. This objective is achieved using a simplified and very economical process.

In the process of the instant invention, citral and homologues thereof and methyl ethyl ketone are condensed by way of the aldol condensation at a reaction temperature below about 10° C., and preferably within the range from about 10° to 0° C., although temperatures as low as —20° C. can be used, at a reaction time in excess of about 15 hours, and preferably in excess of about 24 hours, to yield preferentially upon dehydration the pseudo iso-methyl ionone isomer leading upon cyclization to the most desirable iso-methyl ionone isomer. There is no upper limit on reaction time, but, in general, the reaction time does not exceed about 150 hours, and preferably does not exceed 100 hours. Under these conditions, it is thought that the aldol condensation proceeds to form a disproportionately high ratio of the iso-methyl *beta*-hydroxy ketone. The iso-methyl *beta*-hydroxy ketone is then dehydrated to the pseudo iso-methyl ionone, and the pseudo-ionone is cyclized to form the methyl ionone, in high overall yield.

The process of the invention comprises a combination of two or three reactions: the first, the aldol condensation, and the second, the dehydration, followed (optionally) by the third reaction, cyclization, to form the methyl ionone. Thus, the reaction mechanism is as follows:

Reaction (a)-aldol condensation

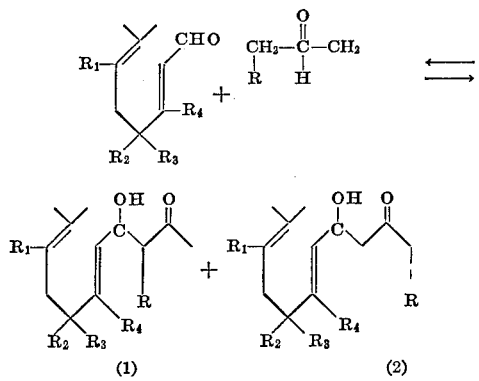

Reaction (b)-dehydration

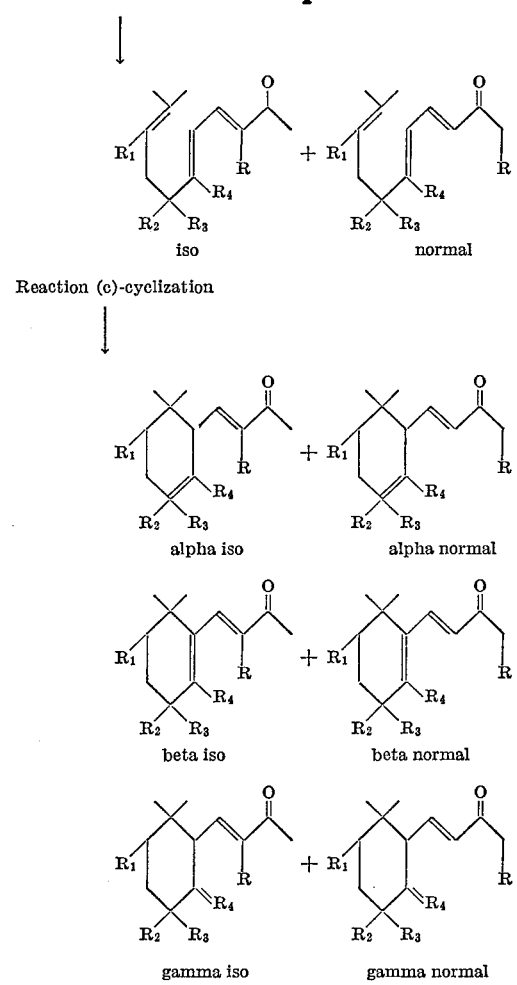

Reaction (c)-cyclization

In the above formulae, $R = CH_3$
$R_1 = CH_3$ or $H$
$R_2 = CH_3$ or $H$
$R_3 = H$ or lower alkyl having from one to about four carbon atoms
$R_4 = H$ or lower alkyl having from one to about four carbon atoms It will of course be understood that when $R_2$ is $CH_3$ and $R_3$ is lower alkyl, the alpha isomers do not exist.

It is quite surprising that a reaction at a lower temperature leads to a higher yield of methyl pseudo ionones of the desirable iso-methyl form. The improved yield is thought to be explained by the following theory, which has not however been demonstrated by other data, but is merely proposed as a possible explanation.

Reaction (a) is an equilibrium reaction. The equilibrium is greatly in favor of the products (1) and (2), but some return to the starting material is taking place. It is considered that at the lower reaction temperature, the reaction to form product (1) is favored over a long reaction time, by disproportionation of product (2) to form product (1). Kinetically, attack on the methyl adjacent to the carbonyl appears to be favored as compared to attack on the methylene group, because the methyl is less terically hindered. This is probably the reason why initially the proportion of reaction product (2) is higher, although the methylene adjacent to the carbonyl is a more reactive site. Since thermodynamically the product (1) is the more stable form, if reaction (a) is left for a relatively long period of time, under conditions such that dehydration of reaction products (1) and (2) to form the pseudo-ionone does not take place, product (2), which may be formed initially in larger proportion, is gradually disproportionated by way of the equilibrium reaction to product 1), which is more stable, and in the end if the reaction mixture is allowed to remain long enough, product (1) becomes predominant. At reaction temperatures below 10° C., dehydration is substantially prevented, and thus the reaction mixture can be allowed to reach the ultimate stable equilibrium in the form of reaction product (1), predominantly.

After reaction product (1) has been formed in predominant proportion, the dehydration is then effected, under proper conditions, and the pseudo-inone can also be cyclized, under conventional conditions.

The aldol condensation is effected in the presence of a lower alkanol, preferably methanol. However, ethanol, propanol, isopropanol, butanol, isobutanol, secondary butanol, and tertiary butanol can also be used. Exemplary $R_3$ and $R_4$ lower alkyl groups include methyl, ethyl, propyl, isopropyl, butyl, isobutyl, secondary butyl, and tertiary butyl.

When $R_1$, and $R_2$ and $R_3$ are each hydrogen and $R_4$ is $CH_3$, the starting aldehyde is citral. In the other cases, the aldehydes are citral homologues, containing none or from one up to a total of four $R_1$, $R_2$, $R_3$, $R_4$ alkyl substituents, ranging from two methyl groups and two butyl groups down to one methyl group, distributed among any of the R locations, as defined. Exemplary aldehydes are:

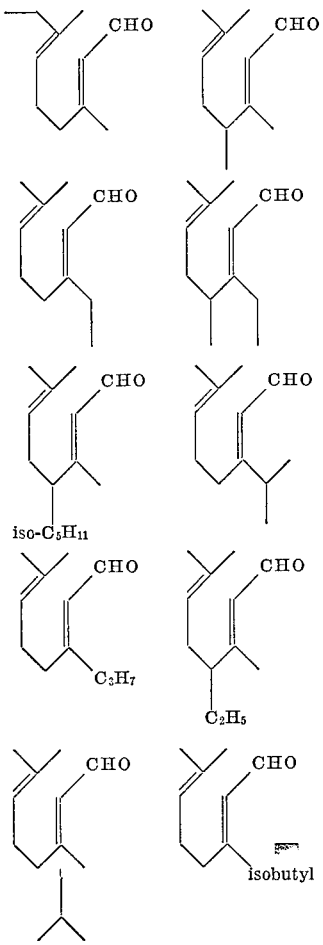

These lead to preparation of the following exemplary *alpha*-iso-methyl ionones:

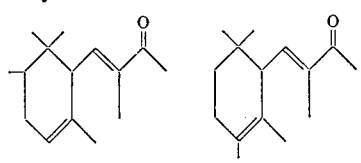

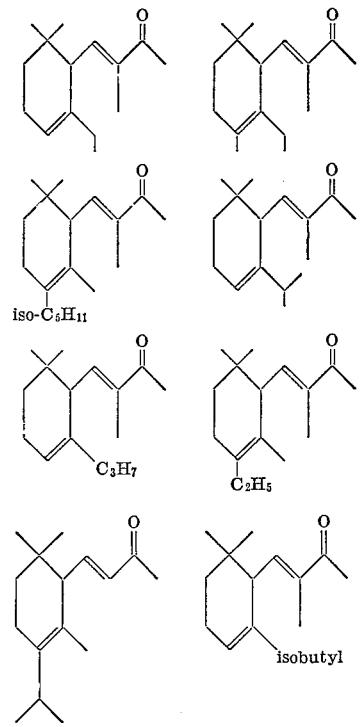

In the case when $R_2$ and $R_3$ are both alkyl, for instance,

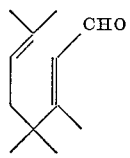

the corresponding iso-methyl ionones are only gamma and beta

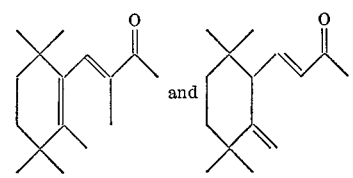

The aldol condensation requires an excess of methyl ethyl ketone. Usually, the amount of ketone is equal to the amount of alcohol used as a solvent. An excess of ketone favors the production of the desired iso-methyl isomers in maximum proportion.

The catalyst should be a potassium or sodium hydroxide or alcoholate, the alcoholate being preferred. Potassium hydroxide or alkoxide tends to favor a higher proportion of product (1) in the completed aldol condensation, but the equilibrium is established more slowly than in the case of sodium hydroxide or alkoxide. However, with sodium hydroxide or alkoxide, the optimum ratio of product (1), although not as high as in the case of the potassium hydroxide or alkoxide, is reached within 20 to 24 hours. Weak bases, such as barium hydroxide, calcium hydroxide, sodium carbonate, and potassium carbonate, can be used as a catalyst, but there is no advantage in using these.

Any lower alkyl alkoxide can be used, such as the methoxide, ethoxide, propoxide, isopropoxide, butoxide, isobutoxide, sec-butoxide or tert-butoxide.

The amount of catalyst can be within the range from about 5 to about 40 grams per mole of aldehyde, but preferably is within the range from about 15 to about 25 grams per mole. The reaction time in the aldol condensation required to reach the optimum proportion of product (1) depends upon the catalyst used and the amount, and is within the range from about 15 to about 150 hours, and preferably between 24 and 100 hours.

After the desired equilibrium in reaction (a) has been reached, the reaction conditions are modified in order to effect dehydration. Dehydration occurs at a reaction temperature in excess of about 40° C. At 40° C., the dehydration requires about 2 hours' time. The dehydration is faster if the reaction mixture is brought to the reflux temperature, usually from about 60° to about 125° C., and refluxed for a short period of time. Usually less than 15 minutes is sufficient, but longer times can be used. Dehydration can also be carried out at a temperature within the range from about 10° to about 30° C., for an extended period of time, ranging, for example 7 to 50 hours, but this may be unduly long in a commercial process. An additional amount of base can be added at the time the dehydration is begun, to speed up the dehydration.

After dehydration is complete, the basic catalyst is neutralized with an appropriate amount of acid, such as a weak acid, for example, acetic acid or formic acid, or a strong acid, such as hydrochloric acid or sulfuric acid. The alcohol solvent and any excess of ketone are then recovered by distillation, and the salts from the neutralization washed out. The weight of crude methyl pseudo-ionones obtained approximates 100% of theoretical. When flash distilled, a residue of from 10% to 12% is usually found, discounting head cuts. The yield of distilled methyl pseudo-ionone is from 83% to 87%. Distillation of the crude product is not necessary. The product can be cyclized crude with equally good yield and quality of methyl ionone product.

The cyclization can be carried out by any conventional method: for example, phosphoric acid catalyst in the presence of a suitable solvent and heating, or in the presence of a sulfuric acid-acetic acid mixture at low temperature. If the dehydration step is omitted or performed incompletely, it would be possible to cyclize the *beta* hydroxy compound directly. This preferably is done under reflux, whereby the water is isotropically removed.

EXAMPLE 1

To a mixture of 800 g. methanol and 800 g. methyl ethyl ketone containing 15 g. of KOH and cooled to 0° C., one mole of citral was added in 30 minutes and the mixture abandoned at 0° to 5° C., for a period of 64 hours. The mass was then permitted to reach 25° C. and held at this temperature for another 23 hours. After neutralization of the KOH with acetic acid, removal of the methanol and excess of methyl ethyl ketone, the sodium acetate was washed out and 205.6 g. of crude product recovered as the residue. Four aliquots of this crude product, 40 g. each, were mixed with 0.5 part of cyclohexane, and each cyclized with 8 g. phosphoric acid 85% catalyst according to one of the following procedures:

Aliquot (a)
Phosphoric acid was added at 96°–97° C.
The reaction mass held at 92.5°–97° C. for one hour.

Aliquot (b)
Phosphoric acid was added at 85° C. and this temperature±1° held for seven hours.

Aliquot (c)
Phosphoric acid was added at 84.5°–85.5° C. and this temperature±1° held for one hour.

Aliquot (d)
Phosphoric acid was added at 69° to 70° C. and this temperature±1° held for one hour.

After cooling, washing the phosphoric acid out with water, neutralizing, and removing the solvent, the resulting product was distilled, and the distillate analyzed by VPC. The results, prorated on the basis of one mole of citral, and the analysis, are listed below:

| Aliquot | Main cut Me-ione G./mole | Yield (percent) in cyclization | Residue, g./mole | VPC analysis main cut, percent Iso* | Normal* | Other |
|---|---|---|---|---|---|---|
| (a) | 153.5 | 89.5 | 8.6 | 78.1 | 21.3 | 0.9 |
| (b) | 147.0 | 85.6 | 14.1 | 81.8 | 14 | 4.2 |
| (c) | 155.2 | 90.5 | 6.1 | 82.4 | 17.4 | |
| (d) | 150.5 | 87.5 | 10.2 | 69.6 | 10.6 | 19.8 |

*Mixture of predominantly *alpha* isomer with some *beta* and *gamma*.

EXAMPLE 2

Sodium methylate 23 g., methanol 1,080 g. and methyl ethyl ketone 1,080 g. were stirred together while one mole citral was added in a period of six hours at 5°–10° C. The temperature was then permitted to reach 15°–20° C. (room temperature) and held for 18 hours longer. After neutralization and workup, similar to that described in Example 1, 210 g. crude product was obtained, which was distilled under vacuum, yielding 178 g. of distillate and 25 g. of residue. 40 g. of the distillate dissolved in 40 g. cyclohexane was added over 10 minutes at 0° to −5° C. into a mixture of 100 g. sulfuric acid 98% and glacial acetic acid 40 g. The mixture was stirred for 10 minutes longer at −5° C., then added to crushed ice, the acids washed with water, and the organic layer neutralized and distilled, yielding 34 g. of product and 2.5 g. of residue. VPC analysis showed 68.6% iso and 29.8% normal methyl ionones. Total yield 72%.

EXAMPLE 3

KOH 23 g., methanol 1,080 g. and methyl ethyl ketone 1,080 g. were stirred together while one mole citral was added in a period of six hours at 5°–10° C. The temperature was then permitted to reach 15°–20° C. (room temperature) and held for 18 hours longer. After neutralization and workup, similar to that described in Example 1, 210 g. crude product was obtained, which was distilled under vacuum, yielding 178 g. of distillate and 25 g. of residue. 40 g. of the distillate dissolved in 40 g. cyclohexane was added over 10 minutes at 0° to −5° C. into a mixture of 100 g. sulfuric acid 98% and glacial acetic acid 40 g. The mixture was stirred for 10 minutes longer at −5° C., then added to crushed ice, the acids washed with water, and the organic layer neutralized and distilled, yielding 34 g. of product and 2.5 g. of residue. VPC analysis showed 72.1% iso and 27.3% normal methyl ionone was produced. Total yield 73%.

EXAMPLE 4

KOH 23 g., methanol 1,080 g. and methyl ethyl ketone 1,080 g. were stirred together while one mole citral was added in a period of one hour at 5° C. The temperature was then permitted to reach 15°–20° C. (room temperature) and held for 22 hours longer. After neutralization and workup, similar to that described in Example 1, 210 g. crude product was obtained, which was distilled under vacuum, yielding 178 g. of distillate and 25 g. of residue. 40 g. of the distillate dissolved in 40 g. cyclohexane was added over 10 minutes at 0° to −5° C. into a mixture of 100 g. sulfuric acid 98% and glacial acetic acid 40 g. The mixture was stirred for 10 minutes longer at −5° C., then added to crushed ice, the acids washed with water, and the organic layer neutralized and distilled, yielding 34 g. of product and 2.5 g. of residue. VPC analysis showed 67.8% iso and 32.2% normal methyl ionone was produced. Total yield 70.5%.

EXAMPLE 5

Two moles of citral were added over one-half hour at 0° C. into a mixture of 1,600 g. methanol, 1,600 g. methyl ethyl ketone and 30 g. KOH, and the mixture held at 0° to 5° C. for 93 hours. The temperature was then raised to 25° C. and maintained for 24 hours. After workup, one-half of the crude was mixed with 0.8 part of cyclohexane and heated to 87° C.; then 0.2 part of phosphoric acid 85% was added in 10-minute period, and the temperature held at 84°–85° C. for one hour. Workup yielded 166.6 g. of distillate and 32 g. of residue. VPC analysis indicated 80.2% iso, 15.9% normal, and 3.9% others. Yield 77%.

EXAMPLE 6

Sodium hydroxide 7.5 g. was dissolved into 400 g. of methanol. Methyl ethyl ketone 400 g. was added and the temperature lowered to 0° C. and 0.5 mole of citral added. The reaction mixture was kept at 0° C. for 24 hours and left standing for 24 hours at room temperature. After usual workup and distillation, 90 g. of distillate was collected, while the residue left was 11 g. An aliquot of 40 g. was cyclized in presence of 8 g. phosporic acid $H_3PO_4$ at 87°–89° C. for 55 minutes. The main cut of distilled product was 35.4 g., analyzing 77.1% iso and 22.9% normal. Yield of methyl ionone based on citral was calculated at 77.3%.

EXAMPLE 7

A mixture of 85.5 g. citral, 100 g. of methanol and 100 g. methyl ethyl ketone was added in six hours' time at 0° to 5° C. into a mixture of 500 g. methanol, 500 g. methyl ethyl ketone and 13 g. sodium methylate, then stirred at 0° to 5° C. for a total of 126 hours. Additional 25 g. of sodium methylate was added and stirring continued at low temperature for another ten hours. After usual workup, 98.5 g. of distillate was obtained and 16 g. of residue.

Cyclization of an aliquot of 40 g. distillate with sulfuric-acetic acid as described in Example 2 yielded methyl ionone at 85 to 15 iso to normal ratio.

Having regard to the foregoing disclosure, the following is claimed as the inventive and patentable embodiments thereof:

1. A process for preparing β-hydroxy ketones from citral and lower alkyl homologues thereof by condensation with methyl ethyl ketone, giving a higher yield and an increased relative amount of the desirable iso β-hydroxy ketone isomer, comprising condensing citral or a lower alkyl homologue thereof and methyl ethyl ketone by way of the aldol condensation in the presence of a lower alkanol and a sodium or potassium hydroxide or lower alkoxide catalyst at a reaction temperature within the range from about 10° to about —20° C. at a reaction time in excess of about 15 hours, thereby obtaining a β-hydroxy ketone.

2. A process according to claim 1, in which the reaction time does not exceed about 150 hours.

3. A process according to claim 1, in which the citral or lower alkyl homologue has the formula:

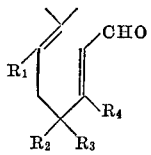

and the *beta*-hydroxy ketone the formula:

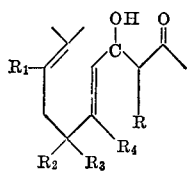

wherein:
R is $CH_3$
$R_1$ is $CH_3$ or H
$R_2$ is $CH_3$ or H
$R_3$ is H or lower alkyl having from one to about four carbon atoms
$R_4$ is H or lower alkyl having from one to about four carbon atoms.

4. A process according to claim 1, in which an excess of methyl ethyl ketone is used, to favor the production of the desired iso-methyl ionone isomers in maximum proportion.

5. A process according to claim 1, in which the catalyst is a potassium hydroxide or alcoholate.

6. A process according to claim 1, in which the catalyst is a sodium hydroxide or alcoholate.

7. A process according to claim 1, in which the amount of catalyst is within the range from about 5 to about 40 grams per mole of aldehyde.

8. A process according to claim 1, in which after equilibrium resulting in a higher yield of the iso β-hydroxy ketone isomer has been reached in the aldol condensation, the reaction conditions are modified in order to effect dehydration of the β-hydroxy ketone isomers at a reaction temperature above 10° C. up to about 125° C. to form the corresponding pseudo methyl ionones.

9. A process according to claim 8, in which the dehydration is effected in the aldol condensation reaction mixture, without intervening separation of beta hydroxy ketone.

10. A process according to claim 8, in which an additional amount of potassium or sodium hydroxide or lower alkoxide is added to speed up the dehydration.

11. A process according to claim 8, in which the pseudo methyl ionone prepared by the dehydration reaction has the formula:

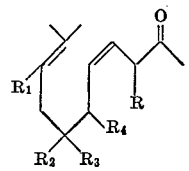

wherein:
R is $CH_3$
$R_3$ is $CH_3$ or H
$R_2$ is $CH_3$ or H
$R_3$ is H or lower alkyl having from one to about four carbon atoms
$R_4$ is H or lower alkyl having from one to about four carbon atoms.

References Cited
UNITED STATES PATENTS

| | | | |
|---|---|---|---|
| 2,957,027 | 10/1960 | Beets et al. | 260—587 X |
| 2,088,021 | 7/1937 | Wickert et al. | 260—594 |
| 583,719 | 6/1897 | Tiemann | 260—587 |
| 762,765 | 6/1904 | Schmidt | 260—587 |
| 3,110,734 | 11/1963 | Kimel et al. | 260—587 |
| 3,344,192 | 9/1967 | Kes et al. | 260—587 |

BERNARD HELFIN, Primary Examiner

N. MORGENSTERN, Assistant Examiner

U.S. Cl. X.R.

252—522; 260—586 R, 587

PO-1050
(5/69)

UNITED STATES PATENT OFFICE
CERTIFICATE OF CORRECTION

Patent No. 3,840,601      Dated October 8, 1974

Inventor(s) Peter S. Gradeff

It is certified that error appears in the above-identified patent and that said Letters Patent are hereby corrected as shown below:

Column 1, line 36, "bata" should be --beta--; lines 38-43, the first formula

"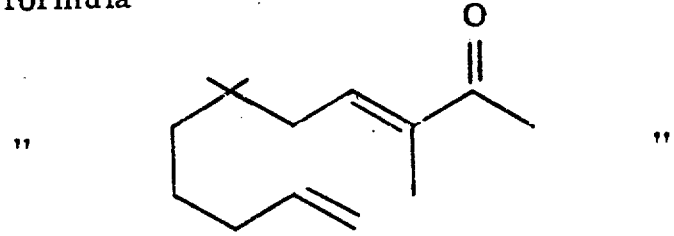"

should be

--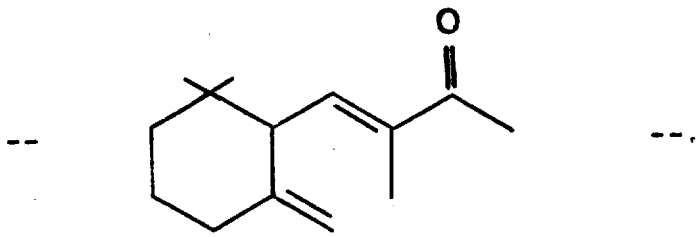--.

Column 2, line 58, "to" should be --too--.

Column 3, line 56, the formula

""

Column 4, line 5, the formula
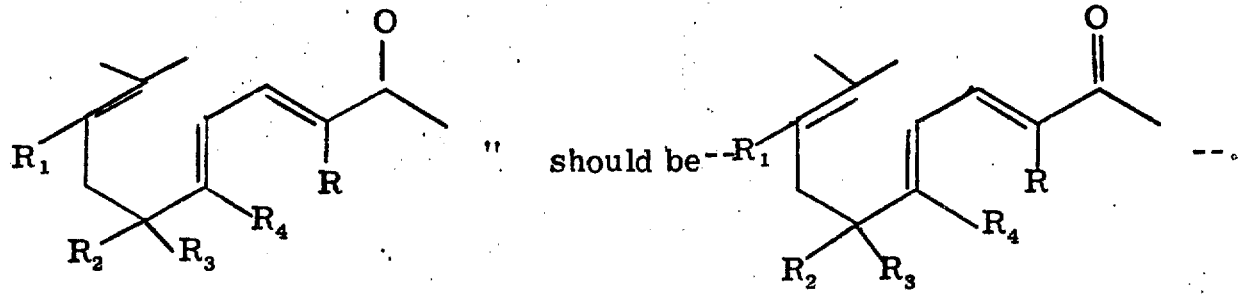
Column 5, line 3, "1)" should be --(1)--; line 12, "inone" should be --ionone--; lines 28-34, the formula
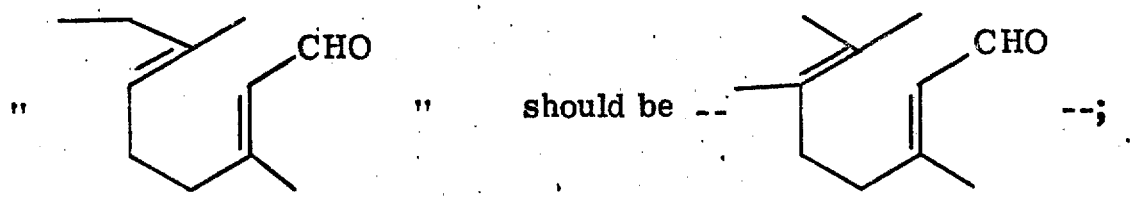
lines 58-66, the formula:
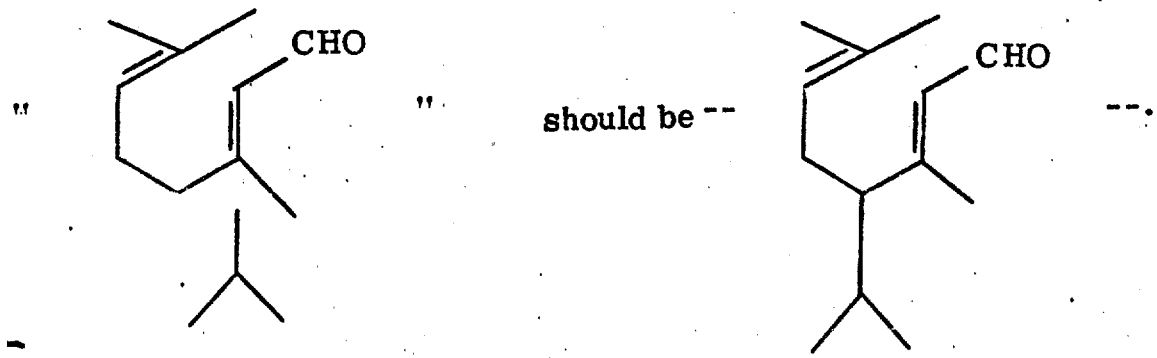

Column 8, line 3, "ione" should be --Ionone--; line 9, last column of Table, "0.9" should be --0.6--.

Column 9, line 8, "777%" should be --77.7%--; line 17, "phosporic" should be --phosphoric--.

Column 10, line 48, "$R_3$" should be --$R_1$--.

Signed and sealed this 17th day of June 1975.

(SEAL)
Attest:

RUTH C. MASON
Attesting Officer

C. MARSHALL DANN
Commissioner of Patents
and Trademarks